United States Patent [19]

Monette et al.

[11] Patent Number: 4,901,344

[45] Date of Patent: Feb. 13, 1990

[54] TELEPHONE SYSTEM DIGITAL CHANNEL BANK INTERFACE

[75] Inventors: Jean-Yves Monette, Prevost; Sylvain Desabrais, Mirabel, both of Canada

[73] Assignee: 156721 Canada Incorporated, Prevost, Canada

[21] Appl. No.: 238,617

[22] Filed: Aug. 31, 1988

[51] Int. Cl.$^4$ .............................................. H04M 1/00
[52] U.S. Cl. ....................................... 379/93; 379/157; 379/201; 370/110.1; 370/111
[58] Field of Search ............... 379/201, 204, 157, 158, 379/93; 370/110.1, 111

[56] References Cited

U.S. PATENT DOCUMENTS

| | | | |
|---|---|---|---|
| 3,748,393 | 7/1973 | Baxter | 370/111 |
| 4,151,373 | 4/1979 | Widmer et al. | 370/111 |
| 4,171,467 | 10/1979 | Evenchik | 370/50 |
| 4,292,474 | 9/1981 | Norrell et al. | 379/157 |
| 4,750,173 | 6/1988 | Blüthgen | 370/111 |

OTHER PUBLICATIONS

Bellamy, John, "Digital Telephony", pp. 101–102.

*Primary Examiner*—Jin F. Ng
*Assistant Examiner*—Wing F. Chan
*Attorney, Agent, or Firm*—Walter C. Farley

[57] ABSTRACT

8 kHz ASK signals are produced by an electronic business set instrument to function as control or feature signals. To avoid the problems of transmitting the 8 kHz ASK over voiceband telephone lines over long distance, the least significant bit (LSB) of each 8 bit word representative of voice signals is caused to be at a predetermined level (e.g., low) when an ASK signal is present and at the other level (e.g., high) when there is no ASK. At the receiving end, the state of the bit is used to regenerate the 8 kHz. Detection of the ASK is performed by a high-pass filter.

5 Claims, 8 Drawing Sheets

FIG. 9A  TWD
FIG. 9B  TDCLK
FIG. 9C  TSPA(B)
FIG. 9D  TSQ
FIG. 9E  TXSLOT
FIG. 9F  TXCTL
FIG. 9G  CODEC OUTPUT
FIG. 9H  U24, I2(I0)
FIG. 9J  LSBTX
FIG. 9K  TXLSBCTL
FIG. 9L  TDATA

TELEPHONE SYSTEM DIGITAL CHANNEL BANK INTERFACE

This invention relates to a Primary Multiplex Terminal (DS-1) Channel Unit Interface permitting simultaneous Voice and Out-of-Band Signaling (8 kHz ASK Messages) transmission over one Voice Channel for Centrex III service using an Electronic Business Set (EBS).

BACKGROUND OF THE INVENTION

Business customers have many communications needs that are not satisfied by the ordinary telecommunications services provided by the message network. One of these needs is rapid, convenient, and economical intercommunications among their employees. In some cases, these needs must be fulfilled at a single location and, in other cases, between two or more locations that are distant from one another. This type of service is furnished by a class of equipment called Business Communications Systems (BCS).

The strategy of furnishing business communications service depends on the size of the customer organization, the manner in which it is dispersed over different locations, and the number of people at each location. In addition, the manner in which the needs are fulfilled depends on the service features to be provided in addition to the basic features of intercommunication.

Typically, where customer needs are concentrated at one location, service is provided by a private branch exchange (PBX or PABX) system. This provides local intercommunication services and can also be furnished with a number of other desirable features. The equipment is usually located at the customer premises.

The need to alter PABX switching system design was indicated when direct distance dialing (DDD) was introduced. The extension of DDD service to PABX stations made possible much faster and more efficient calling to points outside the PABX, leading to the introduction of an improved service, called centrex (CTX), to provide direct inward and outward dialing (DID, DOD). The centrex equipment is located at the local telephone company central office building rather than at the customer's location. The centrex system emulates the functions of a standard PABX. In addition to offering the service features required by a large, complex business, centrex gives PABX customers message network service that is comparable to individual line service in speed, flexibility and efficiency. Although the customer no longer has the investment expense of the PABX equipment, there must be a pair of wires extending between the local telephone company office and the customer's location for each extension telephone having a directory number appearance. The centrex system has several advantages including lower cost, better maintenance because of the location of the equipment at the local telephone company office, and also has battery backup which was normally not available with PABX, thereby preserving operability of the telephone system during power failures. Additionally, the digital centrex system such as that provided on a Northern Telecom DMS-100 digital switch could be upgraded automatically simply by replacing the software package with minimum disturbance of the customer's service.

A more recent development involves a special intelligent telephone set known as Electronic Business Set (EBS) used on the Digital Centrex System. The EBS is a multi-line, fully-featured business communication set equipped with a 32-character alphanumeric liquid crystal display that operates over a single pair of wires regardless of the number of assigned directory numbers. These sets contain programmable special function buttons and code generating hardware. At the touch of a single button, special functions can be performed such as hold, interconnecting parties for a conference call, call transfer and the like. Regular telephone sets could be used with the system, but it would then be necessary for the user to key in a sequence of special codes for each function using the twelve-key pad. The Electronic Business Set instruments have the functions of feature keys, signalling and supervision which are accomplished with binary codes using above-voiceband signals amplitude-shift-keyed at 8 kHz.

The above-voiceband signal is a low-level, 8 kHz amplitude-shift-keyed (ASK) 1000 baud message containing 16 bits, using half-duplex transmission. The presence of the 8 kHz carrier indicates a binary "1" and the absence of the 8 kHz carrier is interpreted as a binary "0". Supervision (off-hook/on-hook), feature activation (i.e., hold, conference call) and signaling (dialing) are all activated via 8 kHz messages.

The 8 kHz control signals are transmitted over telephone lines, and because of the attenuation characteristics at 8 kHz of the conventional non-loaded pairs of wires which are primarily intended to carry voice frequency (VF) signals, the subscriber loops are limited to 15,000 ft. using 26 AWG wire. Thus, only those customers within a 15,000 ft. radius of the Centrex III Central Office (DMS-100) can be served. While a system such as this is workable in some customer environments, a customer having multiple locations distributed several kilometers from each other could not employ this system and are therefore denied this desirable service.

A Digital Loop Carrier System currently in use in various telephone environments, known as the Subscriber Loop Carrier System (i.e., SLC-96), is a digital subscriber carrier system which provides for up to 96 subscriber channels between a central office terminal (COT) and a remote terminal (RT) using up to 4 digital lines (T1) or other digital transmission facilities (e.g., fiber optics).

The shortcoming of previous systems is that the bandwidth is not sufficient to allow direct handling of the 8 kHz control signal.

SUMMARY OF THE INVENTION

Accordingly, an object of the present invention is to provide a technique for including the ASK 8 kHz messages within the normal VF bandwidth (about 300 to about 3400 Hz) without affecting transmission parameters. The invention must also provide transparency of the channel bank to the central office and the EBS, compatibly with line diagnostics provided by the central office, standard customer loop lengths (<15 kft.) and simplex powering toward the Electronic Business Set.

Briefly described, the invention comprises a telephone system including a remote terminal with a plurality of electronic business set telephone instruments connected to the remote terminal, each electronic business set telephone instrument including a handset, a hook switch, a dial tone-generating key pad, a plurality of function keys and means responsive to actuation of each function key to generate a unique ASK function code including a sequence of pulses of a tone at a frequency significantly above voiceband frequency. A central office, including switching means for directing calls to a telephone instrument identified by a dialing sequence, is connected to the remote terminal by a plurality of telephone lines. The remote terminal and the central office each includes coder-decoder means which, in one direction, receives a composite signal including voice frequency analog voice signals and the function codes from each electronic business set and produces a sequence of digital output words representative of the analog voice signals for delivery to the telephone lines, each digital word produced by the coder-decoder means including 8 bits of which the least significant bit is set at a first predetermined level when an ASK signal is present and a second predetermined level when no ASK signal is present. In the other direction the coder-decoder converts received digital words into analog signals for delivery to designated ones of the electronic business set telephone instruments, whereby said ASK function code is transmitted from one instrument to another without increasing the bandwidth of the telephone lines.

BRIEF DESCRIPTION OF THE DRAWINGS

In order to impart full understanding of the manner in which these and other objects are attained in accordance with the invention, reference is made to the accompanying drawings, which form a part of this specification, and wherein:

FIGS. 9A-9L are timing diagram showing the states of signals in various parts of the transmit unit;

DESCRIPTION OF THE PREFERRED EMBODIMENTS

The function of the PCM (Pulse Code Modulation) Channel Bank (Digital Loop Carrier System) is to convert analog voice signals into a digital format and multiplex them for transmission over digital trunk facilities. It also performs the reverse function.

All North American PCM channel banks use a u-Law companding (COMpressing-exPANDING) algorithm. The compression law is:

$$y = \ln(1+u|x|)/\ln(1+u)$$

where y is the output for a given input, x. The standard is now u=255. Companding increases the signal-to-noise ratio in periods of idle or low level signal transmission.

The basic components of the PCM channel bank are channel units to interface analog voice frequency (VF) along with above-voice ASK messages which include the technique of the present invention, common equipment to multiplex the channel signals, and interface digital carrier facilities. The major functions of the common equipment are framing (frame recognition) and signal formatting. Common equipment includes power and alarm modules.

The encoding and decoding processes are accomplished by channel units. PCM channel banks are full duplex (two-way operation)terminals.

PCM channel units in accordance with the invention provide the interface to VF lines (EBS). They perform the function of PAM (Pulse Amplitude Modulation) sampling the VF signals; they also convert the PAM samples to PCM 8 bit octets. The companding and codec (coder-decoder) functions transform the PAM samples to 8-bit words (octets). The channel bit rate, 64 kbit/s, is derived from the sampling rate (8000 Hz or 2 Fmax) and the 8 bits of an octet (8 bits×8000 Hz=64 kbit/s).

The common equipment section of the channel bank comprises the transmit/receive, line interface, special service module, alarm and power units which are common to all channels of the PCM bank.

The transmit unit interleaves the 8-bit PCM octet with 23 octets from the other channels together with a framing bit to produce a DS-1 frame. The frame repetition rate is the channel sampling rate of 8000 Hz. Therefore, line rate becomes:

(24 channels×8 bits/channel+1 frame bit)×8000 Hz=1.544 Mbit/s

The line interface unit converts the unipolar Non-Return to Zero (NRZ) signal format (used internally in the channel bank) to a bipolar Alternate Mark Inversion (AMI) format for transmission over digital carrier facilities.

The line interface unit along with the special service module performs the complementary function of the transmit/receive unit by separating the DS-1 signal into its component channels. The line interface unit accomplishes this by employing a bipolar AMI to unipolar NRZ conversion and frame recognition, demultiplexing into the individual channels for decoding and, finally, expansion of the decoded signals to original PAM samples.

The present invention, in part, is based upon the recognition of the fact that the feature control codes are only transmitted on the order of 1% or less of the off-hook time. The remainder of the time involves voice transmission with no more codes being sent unless another feature such as hold or conference call is needed.

Figure 1:
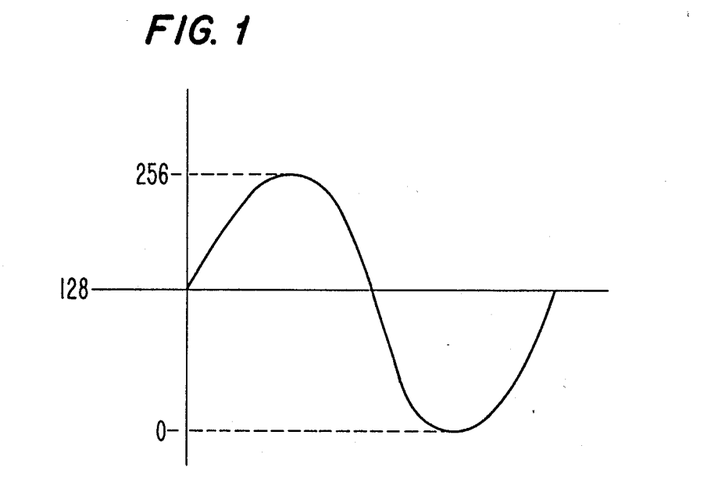
FIG. 1 is an explanatory waveform diagram illustrating the sampling of an analog voice signal.

As shown in FIG. 1, the voice wave form, sampled at every 125 μsec. (1/8000 Hz), is pulse amplitude modulated at 256 possible discrete levels, retrieved and reproduced. A cycle of this idealized sine wave is shown in FIG. 1 with the 256 possible levels being illustrated along the vertical Y axis. The X axis shows the sampling intervals.

Figure 2:
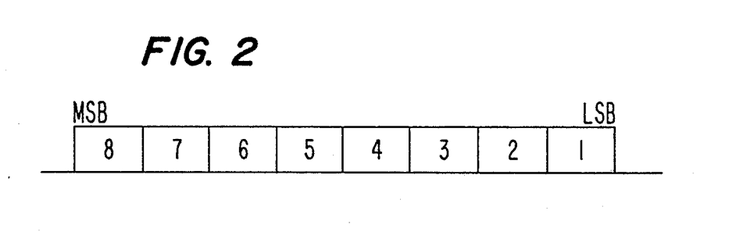
FIG. 2 is an illustration of the bit format of a digital word produced by apparatus in accordance with the invention.

The PAM to PCM conversion of one sampling of the sinewave is represented in FIG. 2, which is an 8-bit octet having 256 possible values. As represented in FIG. 2, the most significant bit will be depicted as being on the left and the least significant bit (LSB) on the right.

The sampling rate of the PCM system results in a sample each 125 microseconds. As previously indicated, the ASK binary message of the EBS is sent at a frequency of 8 kHz and, in a signal at that frequency, the interval between periods is also 125 μs. Accordingly, there is approximately a 100% chance that all periods will be detected. As will be described in detail, the least significant bit of the voice signal sample is used in a distinctive fashion to represent the DMS-100 central office/EBS signalling status.

The system is not asynchronous in the usual sense of that term, but once an ASK binary message signal is sent from either the central office or an EBS, the system requires that a "hand shake" acknowledgement must be received by 17 milliseconds after the beginning of the ASK transmission or a message retransmission is requested. It is therefore necessary to check for the existence of an ASK signal every 125 μs. In the system of the present invention, the status of the least significant bit is altered to indicate the presence or absence of this message. The LSB thus is "borrowed" or monitored in such a way that it always indicates the status of the ASK message without significantly degrading the voice information insofar as the users of the system are concerned.

Figure 3:
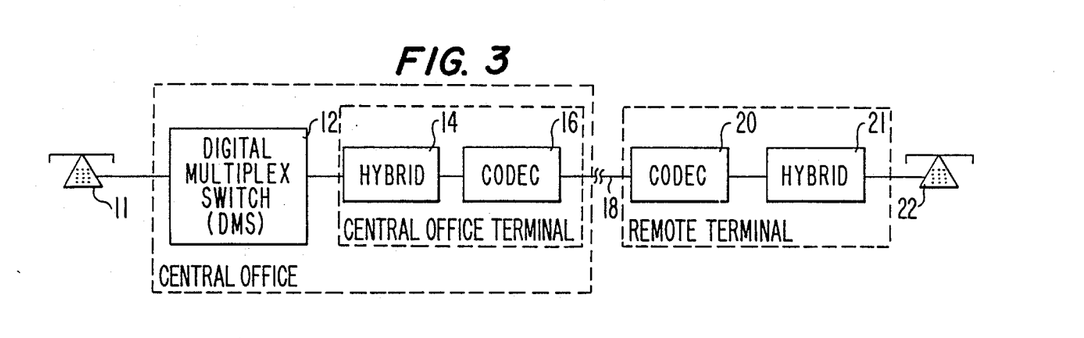
FIG. 3 is a simplified schematic block diagram of a part of the apparatus in accordance with the invention.

A highly simplified schematic of a small part of the telephone system is shown in FIG. 3 in which an EBS instrument is connected to a DMS 12 which responds to off-hook signals from EBS 11 and dial signals to connect the instrument to the desired EBS instrument 22. The connection is made with a two-wire loop coupled through a hybrid circuit 14 in a conventional fashion. The output of the hybrid circuit is then connected to the codec 16 which performs the analog to digital conversion for multiplexing purposes to other channels. The multiplexed PCM signal composed of 1.544 megabits/second is coupled onto a T1 line 18 which ultimately reaches the remote coder-decoder 20 which shifts the associated 8-bit signal and returns it to analog form for connection through a hybrid circuit 21 to the electronic business set 22. In the system of FIG. 3, units 12, 14 and 16 are part of the COT and units 20 and 21 are part of the RT. There are normally 96 hybrid and CODEC units at each end (48 printed circuit cards with two sets per card), each of these units also including other circuitry as will be described.

In the call event outlined above, the remote unit 20 checks to see whether the least significant bit of the octet received indicates the existence of an ASK message. Depending upon the state of the least significant bit, the internal circuitry of the remote unit will either generate an 8 kHz ASK signal or not. It is important to recognize that the actual carrier frequency of the ASK message could be of any value because the determining signal controlling whether the 8 kHz is on or off is a digital state. This is a significant difference from the prior art in which it was considered necessary to have greater bandwidth to transmit the 8 kHz ASK signal. In the present system, the existence or absence thereof is determined by the state of the least significant bit, requiring no additional bandwidth at all.

Figure 4:
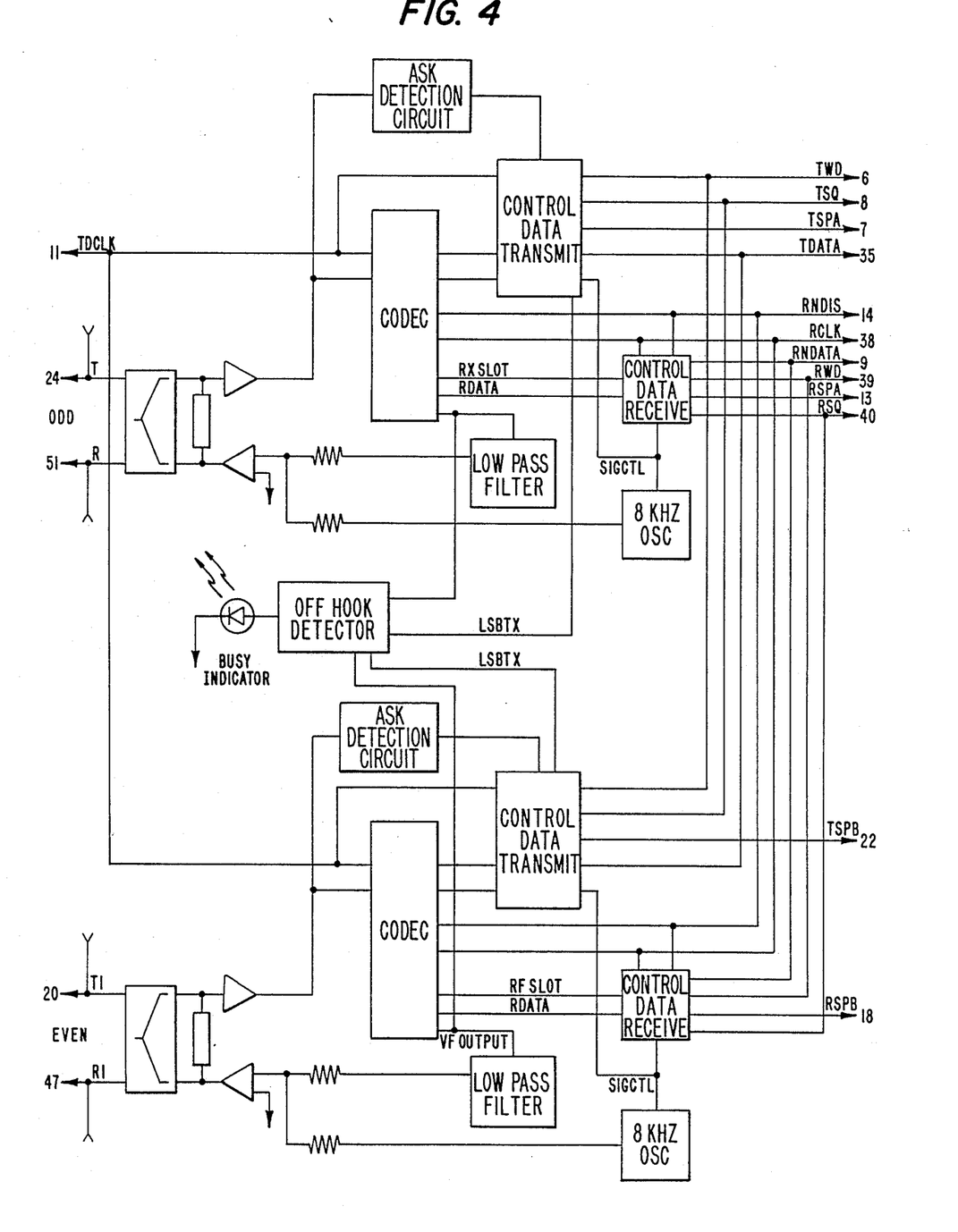
FIGS. 4 and 5 are schematic block diagrams of apparatus usable in the Central Office terminal and Remote Terminal, respectively, in accordance with the invention.
Figure 5:
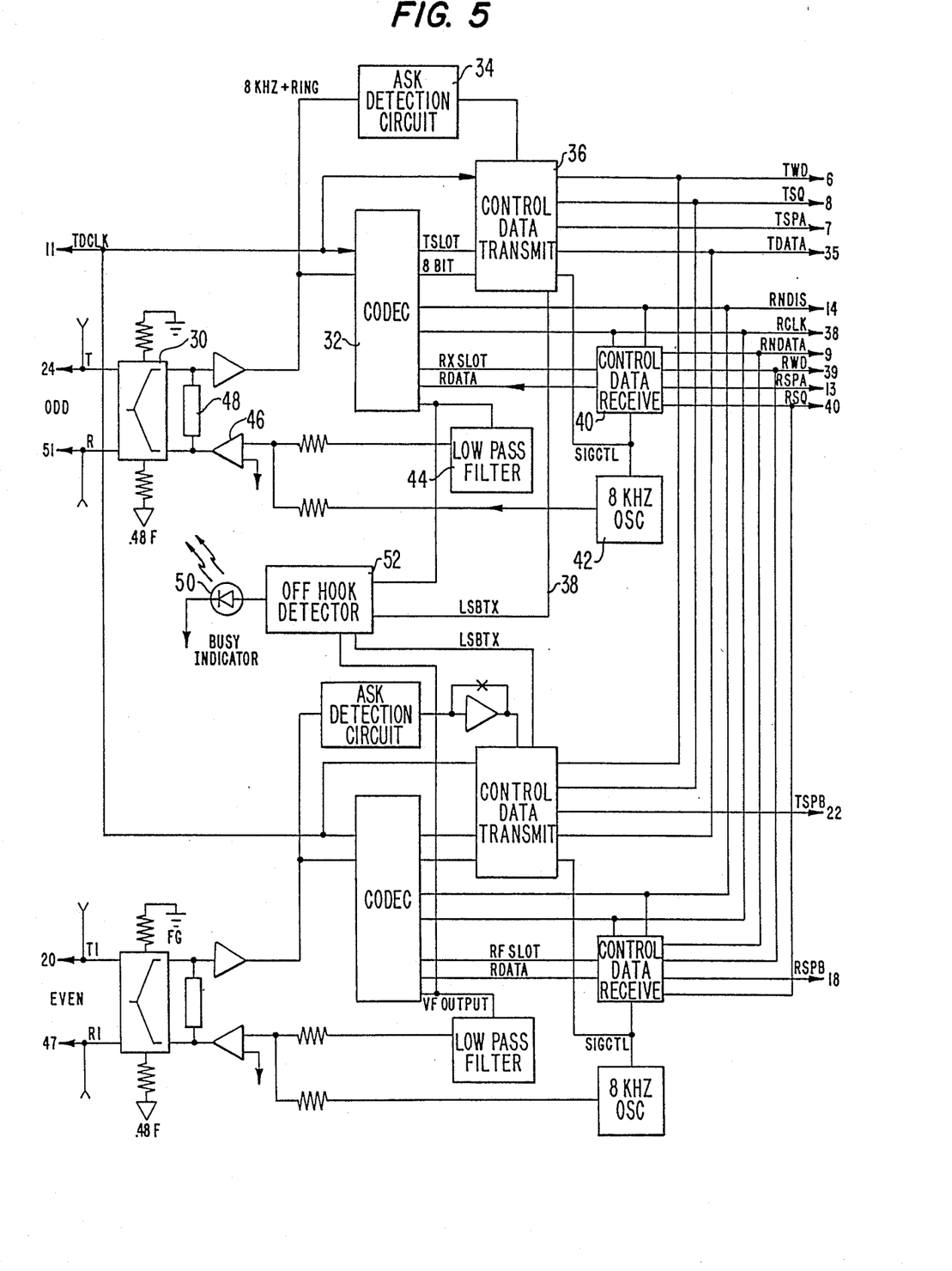

More complete schematic diagrams are shown in FIGS. 4 and 5 wherein FIG. 4 shows the COT circuit and FIG. 5 the RT circuit, the circuits being very similar to each other. Referring now to FIG. 5, the circuit operation will be considered under the conditions that an incoming call is being received, i.e., a call from the central office (COT) to an electronic business set at the remote terminal. A ring signal is transmitted from the central office line card to the Tip and Ring terminals of the COT EBS channel unit. The ring signal has two frequencies, 513 and 649 Hz and alternates between those two signals at a frequency of 9 Hz at a level of −10 dBm0. The ring signal also includes an "alert on" ASK message embedded into the first ring burst at a level of −6 dBm0. The composite signal is fed to a 2-to-4-wire hybrid circuit 30 and to the inputs of codec circuit 32 for analog to digital conversion. The codec circuit includes an anti-aliasing band pass filter (300 to 3400 Hz), a gain amplifier and an analog to digital converter. The composite signal is also fed into a filter 34 which is a fifth and third order 8 kHz high pass filter for detection and conditioning of ASK messages. The voice frequency component is removed by filter 34 which preferably exhibits a 100 dB loss at 1000 Hz. ASK signals are amplified by two operational amplifiers having a gain of 16.2 to ensure proper detection. The detection threshold is set to −10 dBm. The detected sine wave is then converted into a square wave through a Schmitt trigger when the filter output signal reaches the negative reference level, set to −14 dB at 8 kHz. The presence of a square wave at filter 34 output indicates the presence of an 8 kHz signal and enables the transmit data control circuit 36 for logic processing. Data transmission is enabled with the presence of a logic high at the TSP (N) and TSQ terminals, the timing control signals of the channel bank. During these conditions, 8 bits of data are shifted out by codec circuit 32 approximately 140 nanoseconds later. The presence of 8 kHz codes pulls the output on LSBTX conductor 38 low. This low condition indicates the state of the least significant bit (LSB). The data from the codec is then substituted according to the state of LSB at each 125 microsecond interval. The modified data are then provided (in PCM format) to the transmit/receive unit in the TDATA bus for transmission over the T1 facility toward the remote terminal (RT).

The remote terminal common equipment (LIU, SSU) receives the DS-1 bit stream, the bipolar PCM 1.544 megabits per second, from the COT, decodes the PCM and forwards the information in NRZ unipolar format to the common bus identified as RNPCM. When the common equipment addresses the appropriate channel by a logic high on RSP(N) and RSQ, a timing pulse on RWD is then generated by the common equipment to direct the channel unit to accept the PCM sample from the RNPCM bus. The incoming 8 bit data is forwarded to the codec 32 and to the ASK control logic circuit 40 for evaluation of the least significant bit.

The logic state of the extracted LSB is then analyzed by the LSB control circuit. A logic low indicates the presence of ASK signal, thus activating the 8 kHz sine wave generator 42 until the next LSB change of state from low to high. Thus, the control feature signal is "reconstructed" at the receiving end without actually transmitting 8 kHz.

A delay of approximately 312.5 microseconds is required after the reception of the last logic low of the LSB in order to maintain the output of detection circuit 34 at a level above the detection reference level to prevent potential feedback in the direction opposite to the direction of transmission.

With a clock signal of 1.544 mHz, producing a pulse train of 1.536 mHz, a signal pulsing at the frequency of 8 kHz appears. An active filter converts the produced square wave into a sine wave. The zero crossing level of the sine wave is synchronized with the rising and falling edges of the 8 kHz oscillator 42.

The analog output signal produced by the 8 kHz oscillator 42 (alert on) message is fed into a summing amplifier 46 which is adjusted to provide a −6 dBm level at 8 kHz.

The summing amplifier also accepts voice frequency outputs signals (ringing) from the 3900 Hz low pass filter 44. A zero dB insertion loss is provided prior to transmission through Tip and Ring by the hybrid transformer circuit 30. The composite signal (ringing with the embedded alert on ASK message) is then forwarded to the electronic business set via the non-loaded cable pair which, as previously indicated, should be less than 15,000 ft. away.

Channel unit over-voltage protection is achieved by shunt varistors 48 connected across the secondary windings of the hybrid circuits.

A busy indicator 50 is provided on the faceplate of the unit to monitor the busy status of the channel unit, both odd and even channels. The busy lamp is activated by the off-hook detector 52 which operates with both voice signals, greater than −8 dBm, and ASK 8 kHz messages present on the receive path of transmission. A hangover of 2.2 minutes is initiated after the detection of the last voice or ASK signal.

To summarize, the coder-decoder output is a sequence of serial 8-bit words each 125 μs in length from the conversion of the voice from analog into digital form, this output being connected to the control data transmit unit. In addition, the voice signal is also supplied through a fixed gain, 0.dBm amplifier to a special 8 kHz filter which can be described as a high-pass filter and which will be shown in further detail subsequently. The output of this filter is an 8 kHz square wave which is subsequently treated as a digital signal, i.e., one which has only two meaningful states. The control data transmit unit 36 receives multiplex timing sequence information and puts out a data signal. The control circuit removes the least significant bit from the voice word and inserts either a 1 or a 0, depending upon whether there is an 8 kHz signal or not. The filter output stops for at least 125 microseconds. The output is delivered to an output bus of the channel bank as one of the 24 multiplexed channels. TWD, TSQ and TSPA are timing signals which together produce a window for the data output, thereby defining one of the 24 channels.

To avoid simultaneous ring and off-hook signals, the receive channel must be blocked at the appropriate time or a positive feedback loop would be created. Therefore, after the least significant bit of the output word, a delay of 312.5 μs is created during which the receiving channel is blocked. This is the SIGCTL signal from the control data receive unit to the control data transmit unit. The duration of the delay is based on filter characteristics.

At the receiving end, there is received a unipolar bit stream, after demultiplexing, which includes 7 bits plus the one least significant bit which may or may not be present. The control data receiver produces two outputs, one of them being an 8 bit voice frequency and the other being one bit of data. The status of the least significant bit is checked. If the least significant bit is detected as indicating a 0, the 8 kHz oscillator in the receiver is activated and the 7 bit string is completed by adding a bit at the end. The least significant bit added is always a 1. If a 1 is already present, it is allowed to remain.

At the beginning of the 8 bit word is a sign bit which indicates the polarity of the wave represented by that word. If the sign bit is 1, the first half of the analog wave is positive. The 6 subsequent bits are interpreted to the nearest of 128 levels during that positive wave form. If the sign bit is 0, the subsequent bits are evaluated to 128 levels in the negative half of the wave. The LSB is always forced high and therefore inhibits the possibility of sampling even quantifying steps. Thus, there is some theoretical distortion, but it is not discernable to the listener. The measurements indicate that the distortion is 0.5 dB higher than if the full bit stream were used, a level of distortion which is fully acceptable.

Stated differently, the least significant bit is forced high and when there is signaling, it is forced low. When it is high, the presence of the least significant bit as a 1 means that all numbers, i.e., all samples, will be odd.

The 8 kHz oscillator is activated as a function of the state of the LSB and coupled through the adder to the line. Again, the transmitter is blocked with the same delay as was used in connection with the receiver.

Figure 6:
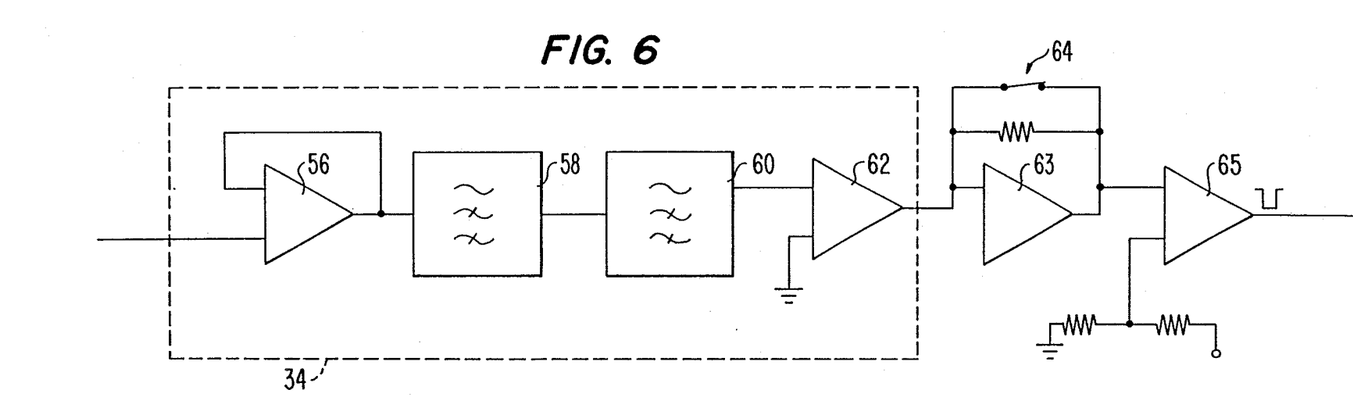
FIG. 6 is a schematic block diagram of a bandpass filter usable in the apparatus of FIGS. 4 and 5.

The ASK detection circuit 34 is shown in more detail in FIG. 6. Essentially the same circuit is used on both the central office terminal and receiving terminal except for gain settings as will be noted. The circuit shown is otherwise applicable to both units. The input signal, including the ASK signal if one is present, is received at the input to a voltage follower circuit 56 which maintains a high impedance at the detection circuit input. The output of the voltage follower is delivered to the input of a fifth order Butterworth high pass filter 58 having a transfer function of 100 (log F/F$_l$), or 30 db/octave. The output of filter 58 is fed to a third order Butterworth high pass filter 60 having a transfer function of 60 (log F/F$_l$), or 18 db/octave. A 0 dbm 1000 Hz signal supplied to the input of filter 58 will experience approximately 100 db of attenuation before reaching the output of filter 60.

The filtered signal is amplified by operational amplifiers 62 and 63 which boost the filtered 8 kHz signal for proper detection. The gain is set at 16.2 for the COT and either 25.5 or 161.86 for the RT, depending on the setting of loop switch 64 which shunts amplifier 63 in the RT unit only.

The amplified output of circuit 63 is applied to the input of a Schmitt trigger which produces a square wave signal when the output of the amplifiers reaches the negative reference level of the Schmitt trigger which is set to −14 db at 8 kHz for the COT and −34 db at 8 kHz for the RT. The square wave indicates the detection of valid ASK 8 kHz codes. The output of the Schmitt trigger is delivered to the control data transmit unit 36 in either COT or RT.

Data transmission is enabled when TXSLOT[inv] out of the codec is low. (In the following discussion, an inverted signal which would conventionally be indicated by a line over the signal identification will be represented by the identification of the signal followed by [inv].) In unit 36, shown in FIG. 7, to achieve the proper timing required by the TXSLOT input to the codec unit 32, referring also to the timing diagram of FIG. 9, the TWD control signal (9A) from the common equipment must be inverted and delayed by about 40 nanoseconds at the Transmit Clock falling edge. This is provided by a TWD Control unit 66 which includes a D flip-flop, which performs the inversion and synch function, and a CMOS gate unit which adds the delay. The TWD1 output is supplied to TXSLOT timing control 68. TXSLOT provides the 8 bit transmission window (9E) for the CODEC and includes a D flip-flop and an AND gate which received TSQ and TSP. The window begins on the next rising edge of TWD1 after TSQ (9D) and TSPA(B) (9C) from bank commons are pulled high. The window ends with the next rising edge of TWD1 when TSQ and TSPA(B) are low. During this window, beginning at the first clock rising edge, eight data bits are shifted out by the codec.

Figure 7:
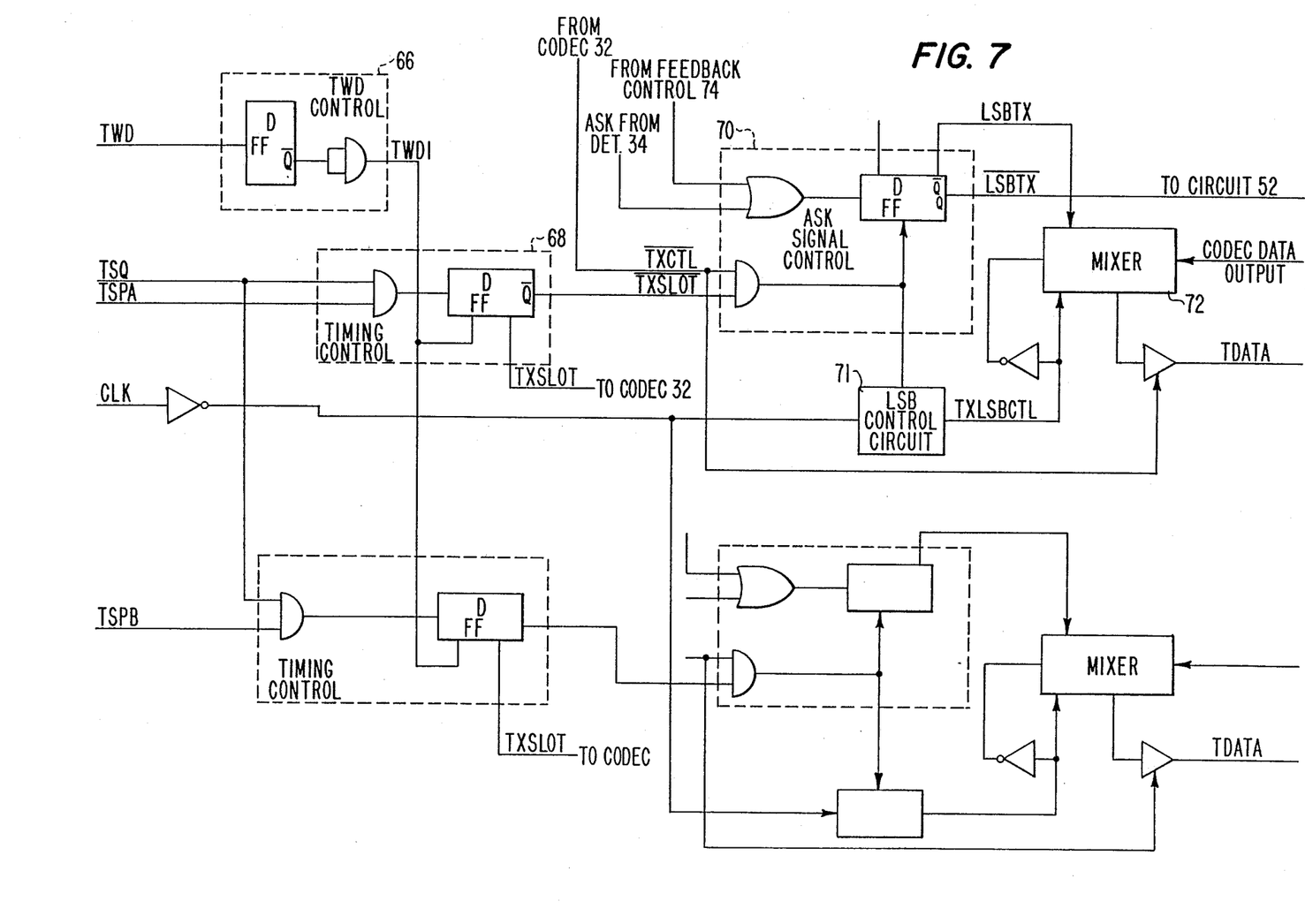
FIG. 7 is a schematic block diagram of a control data transmit unit usable in the apparatus of FIGS. 4 and 5.

The ASK signal from detection circuit 34 is received by ASK signal control circuit 70, along with TXSLOT-[inv]. The 8 bit data shifted out by the codec is sent to a mixer 72 having two AND gates and one OR gate which substitutes the LSB according to the LSB status as indicated by the ASK signal control circuit 70. A high indicates an absence of ASK and a low indicates its presence. A counter provides the timing sequence to locate the LSB every 125 microseconds. Circuit 70 includes a D flip-flop, an AND gate and one OR gate which change the state of the LSB depending on the presence or absence of ASK signals. When TXSLOT-[inv] and TXCTL[inv] are going high, the D flip-flop in CKT 70 resets and pulls LSBTX[inv] high after each sampling.

When LSBTX[inv] is low, indicating the presence of ASK, that sets the flip-flop in circuit 70, providing a low to mixer 72 and the eighth bit of the word will then be low. Acknowledgement of the absence of 8 kHz before the next TXLSBCTL leaves LSBTX[inv] high. The presence of the ASK signal during the rising edge of TXSLOT[inv] and TXCTL[inv] will make LSBTX[inv] low for the present and the next samplings. TXLSBCTL is generated by a logic low of TXSLOT[inv]. This triggers a 4 bit counter, LSB control circuit 71, on the next clock rising edge until the 8th clock cycle. The output TXLSBCTL then goes high to enable LSB transmission. The TXLSBCTL pulse has an approximate duration of one clock cycle repeated every 125 microseconds.

Figure 8:
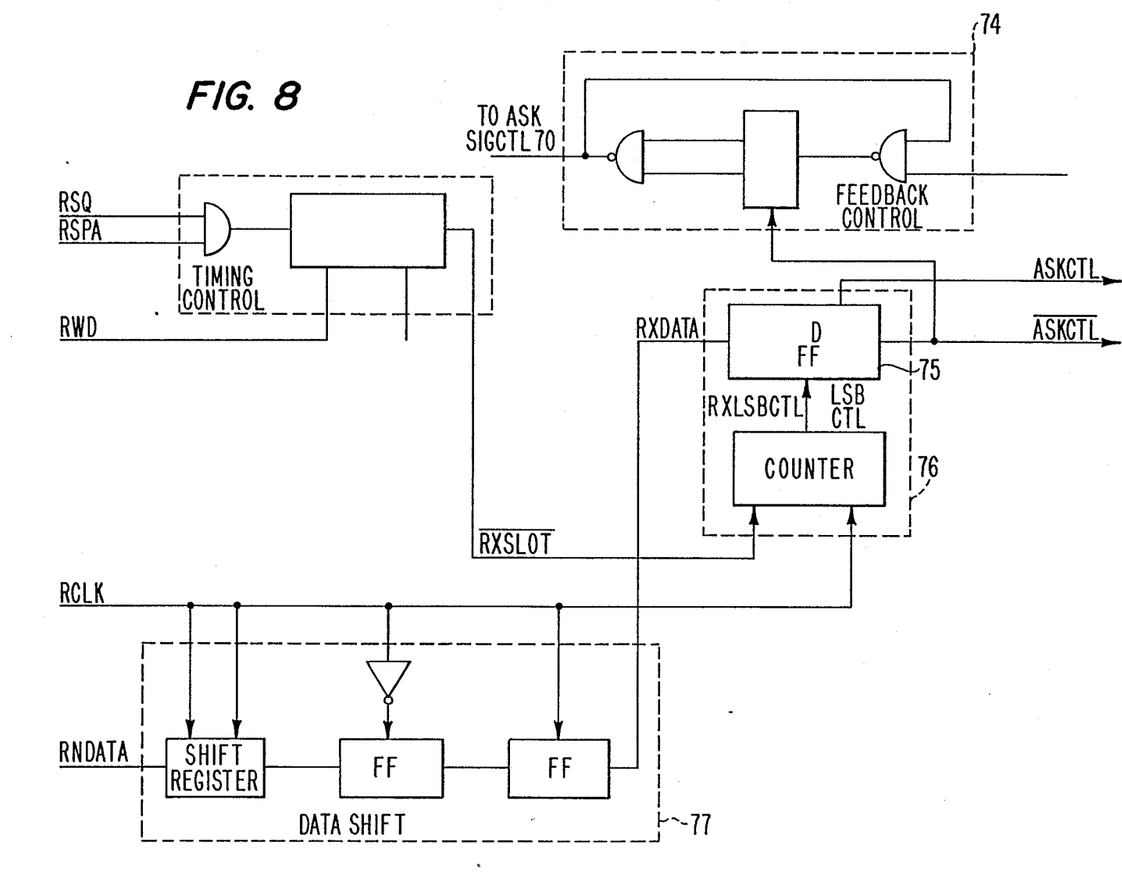
FIG. 8 is a schematic block diagram of a control data receive unit usable in the apparatus of FIGS. 4 and 5.
Figure 10:
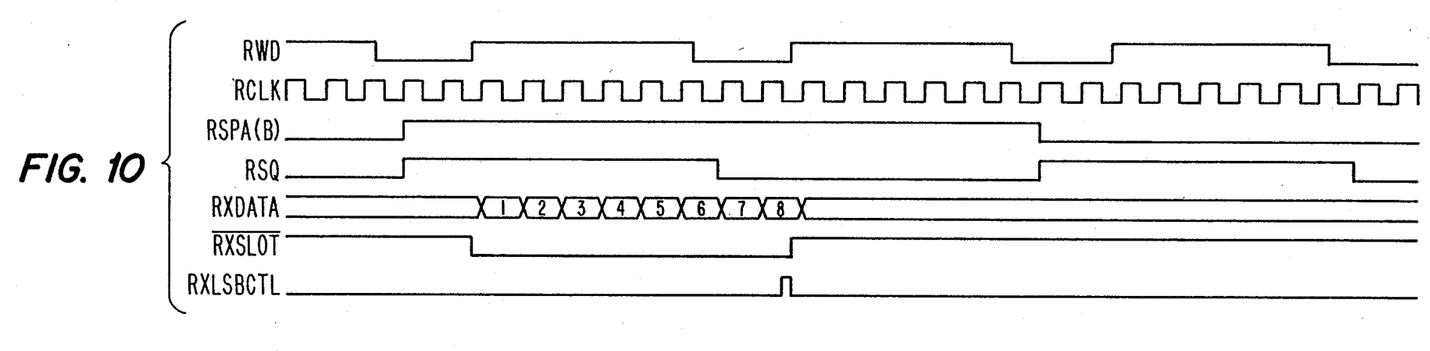
FIGS. 10 and 11 are timing diagrams at two different scales showing the states of signals in various parts of the receive unit.
Figure 11:
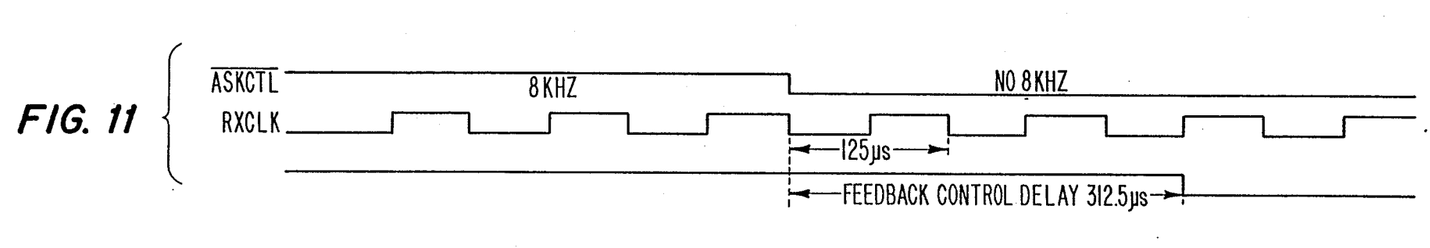

Turning now to the control data receive circuit 40, referring to FIGS. 8, 10 and 11, a nine bit shift is required to locate the 8 bits of RNDATA into the RXSLOT[inv] window which is accomplished by an 8 bit shift register followed by 2 D flip-flops which each shift the data ½ bit. RXSLOT[inv] is initiated on the next RWD rising edge when RSQ and RSPA (or RSPB, depending on which channel is being discussed) are pulled high as seen in FIG. 10. RXDATA is simultaneously transmitted to the codec and LSB control circuits. The analog output of codec and the 8 kHz oscillator are summed by an operational amplifier.

An LSB control circuit 76 includes a counter to produce a RXLSBCTL (Receive Least Significant Bit Control) pulse every 125 microseconds with the occurrence of RXSLOT "low" and the 8th falling edge clock cycle of RXCLK and a D flip-flop then latches the LSB. The D flip-flop generates ASKCTL and its inverse which are used to control two analog switches for 8 kHz generation. In circuit 76, a RXLSBCTL (Receive Least Significant Bit Control) pulse is provided to latch LSB at a D flip-flop 75. The signal ASKCTL[inv] is provided by the D flip-flop 75. The duration of RXLSBCTL is equal to one-half clock cycle. It is positioned at the 8th clock cycle and begins at the falling edge of RCLK after a low condition of RXSLOT[inv].

An ASK feedback control circuit 74 includes a counter and two NAND gates which provide a delay of about 312 microseconds (2.5 frames) to provide an input to the OR gate in circuit 70 so that the ASK signal from detector 34 can go through the OR gate to the flip-flop in circuit 70. When that input is not present, the ASK signal generated in the receive circuit is locked out to prevent potential feedback in the opposite direction. In this context it should be noted that "frame" refers to the time window defined by TXCTL and "sample" refers to the 8th bit window. A high on RXSLOT[inv] resets the counter.

Figure 8A:
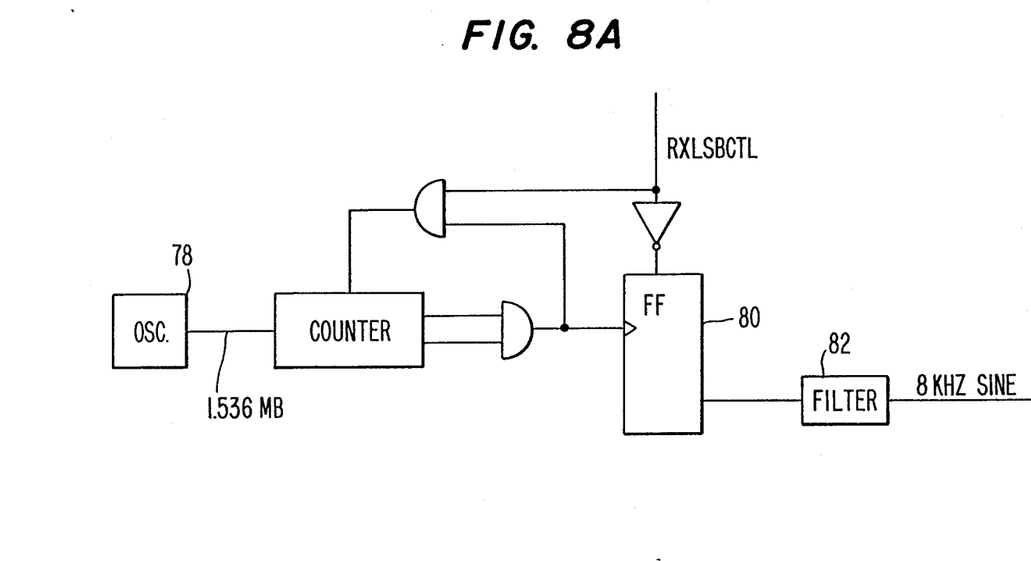
FIG. 8A is a schematic block diagram of a sine wave generator usable in the apparatus of FIG. 4 and 5.
Figure 9A:
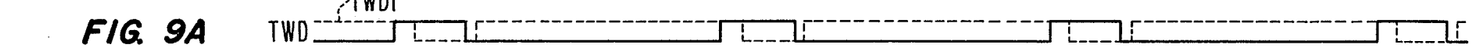
Figures 9B, 9C:
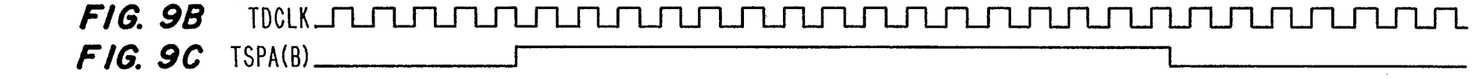
Figure 9D:
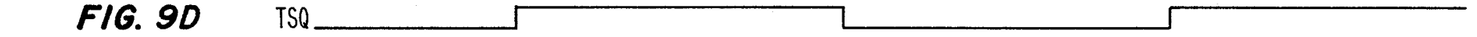
Figure 9E:
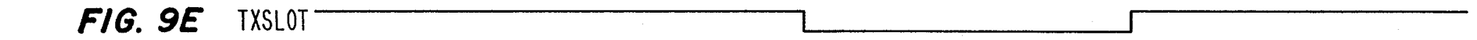
Figure 9F:
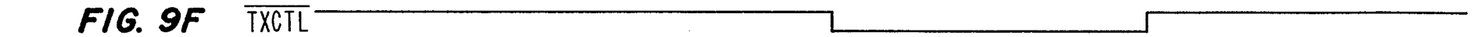
Figure 9G:
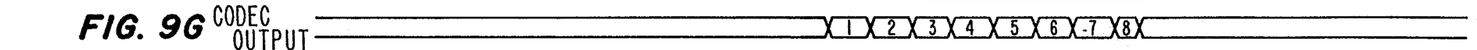
Figures 9H, 9J:
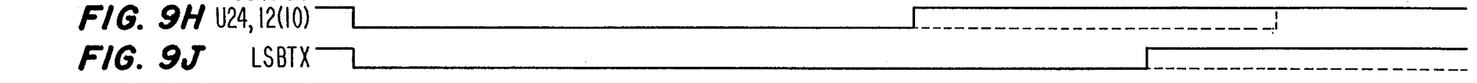
Figure 9K:
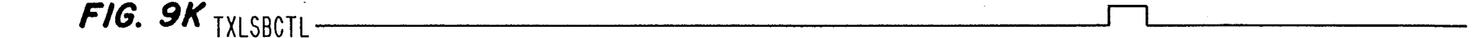
Figure 9L:
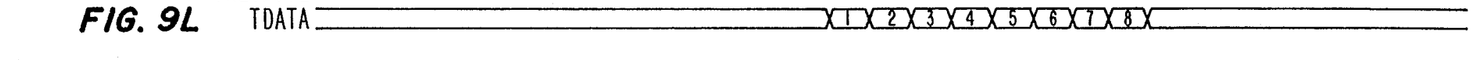

The sine wave generator includes an oscillator circuit 78 which receives a clock signal of 1.544 MHz and produces a 1.536 MB/s pulse train which is fed into a counter and an AND gate arranged to produce an 8 kHz pulse. A D flip-flop 80 is used to combine that 8 kHz pulse with the RXLSBCTL pulse to provide an 8 kHz square wave signal. The sine wave conversion is accomplished by a bandpass active filter 82. The sine wave zero-crossing level is then synchronized with the rising and falling edge of the output of the D flip-flop 80.

The signal at the output of the analog switch 84, an 8 kHz sine wave, will start at zero crossing level for the ODD channel but will represent a 30° lag on EVEN channel due to the fact that signal synchronization is provided by the ODD channel.

While certain advantageous embodiments have been chosen to illustrate the invention, it will be understood by those skilled in the art that various changes and modifications can be made therein without departing from the scope of the invention as defined in the appended claims.

What is claimed is:

1. An improved telephone system of the type having a remote terminal, a plurality of electronic business set telephone instruments connected to the remote terminal, each electronic business set telephone instrument including a key pad, a plurality of function keys and means responsive to actuation of each key pad key or function key to generate a unique ASK function code including a sequence of pulses of a tone at a frequency significantly above voiceband frequency, a central office including digital multiplex switch (DMS) means for responding to function codes generated by an electronic business set telephone instrument and for directing calls to a selected telephone instrument identified by a unique dialing sequence, and a plurality of telephone lines interconnecting the remote terminal and the central office terminal, the improvement comprising the combination of coder-decoder means in said remote terminal including means for receiving a composite signal in one direction including voice frequency analog voice signals and said function codes from an electronic business set telephone instrument and for producing a sequence of digital output words representative of said analog voice signals for delivery to said telephone lines, each said digital word produced by said coder-decoder means for transmission over said telephone lines including 8 bit groups in each of which the least significant bit is set at a first predetermined level when an ASK is present and a second predetermined level when no ASK is present for delivery on said telephone lines to said DMS means in said central office;

said coder-decoder means further including means for receiving digital words from said telephone lines, for converting said received digital words into analog signals for delivery to a selected electronic business set telephone instrument and for generating ASK signals when the least significant bits of said received words are at said first predetermined level whereby said ASK function code is transmitted from another electronic business set telephone instrument and to or from said DMS means without increasing the bandwidth of said telephone lines.

2. A system according to claim 1 wherein said coder-decoder means in said terminal further includes filter means for receiving said composite signal, removing the voice frequency component thereof and producing a digital output signal representative of the presence of an ASK function code.

3. A method of operating a telephone system for communicating an above-voiceband ASK function signal between a central office and a remote terminal, the remote terminal having a plurality of electronic business set telephone instruments connected thereto, each electronic business set telephone instrument including a key pad, a plurality of function keys and means responsive to actuation of each function key to generate a unique ASK function code including a sequence of pulses of a tone at a frequency significantly above voiceband frequency, the central office and remote terminal being interconnected by voiceband telephone lines and being separated by a predetermined distance, the central office including switching means for directing calls to a telephone instrument identified by a dialing sequence, the remote terminal and said central office each including coder-decoder means for, in one direction, receiving a composite signal including voice frequency analog voice signals and the ASK function codes from each said electronic business set and for producing a sequence of digital output words representative of the analog voice signals for delivery to the telephone lines, each digital word produced by the coder-decoder means including a predetermined number of bits, the method including
    determining when an ASK function code is present in a signal to be transmitted over the telephone lines,
    digitizing into a plurality of 8 bit words the signal to be transmitted,
    setting the least significant bit of each word at a first predetermined level when an ASK function code is present and a second predetermined level when no ASK function code is present,
    converting received digital words into analog signals for delivery to designated ones of said electronic business set telephone instruments,
    determining from the least significant bits of all of the received words an ASK function code originated at the transmitting location, and
    reconstructing the ASK function code at the receiving end whereby said ASK function code is transmitted from one instrument to another without increasing the bandwidth of said telephone lines.

4. An improved telephone system of the type having a remote terminal, a plurality of electronic business set telephone instruments connected to the remote terminal, each electronic business set telephone instrument including a key pad, a plurality of function keys and means responsive to actuation of each key pad key or function key to generate a unique ASK function code including a sequence of pulses of a tone at a frequency significantly above voiceband frequency, a central office including digital multiplex switch (DMS) means for responding to function codes generated by an electronic business set telephone instrument and for directing calls to a selected telephone instrument identified by a unique dialing sequence, and a plurality of telephone lines interconnecting the remote terminal and the central office terminal, the improvement comprising the combination of
    coder-decoder means in said central office including means for receiving 8 bit digital words from said telephone lines, for converting said received digital words into analog signals, for generating ASK signals when the least significant bits of said received words are at a first predetermined level and for coupling composite signals including said analog signals and said ASK signals to the DMS means in said central office so that said DMS means can respond thereto; said coder-decoder means further including means for receiving composite signals from said DMS means including voice frequency analog voice signals and said function codes and for producing a sequence of digital output words representative of said analog voice signals for delivery to said telephone lines,
    each said digital word produced by said coder-decoder means for transmission over said telephone lines including 8 bit groups in each of which the least significant bit is set at a first predetermined level when an ASK is present and a second predetermined level when no ASK is present for delivery on said telephone lines to a remote terminal and ultimately to a selected electronic business set telephone instrument, whereby said ASK function code is transmitted to or from said DMS means to or from an electronic business set telephone instrument without increasing the bandwidth of said telephone lines.

5. A system according to claim 4, wherein said coder-decoder means in said central office terminal further includes
    filter means for receiving said composite signal, removing the voice frequency component thereof and producing a digital output signal representative of the presence of an ASK function code.

* * * * *